United States Patent
Nakamura et al.

(10) Patent No.: US 7,354,159 B2
(45) Date of Patent: Apr. 8, 2008

(54) PROJECTION TYPE VIDEO DISPLAY

(75) Inventors: Hisashi Nakamura, Hyogo (JP); Kei Yasukawa, Osaka (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 192 days.

(21) Appl. No.: 11/229,492

(22) Filed: Sep. 20, 2005

(65) Prior Publication Data

US 2006/0066818 A1 Mar. 30, 2006

(30) Foreign Application Priority Data

Sep. 24, 2004 (JP) ............... 2004-278502

(51) Int. Cl.
  *G03B 21/14* (2006.01)
(52) U.S. Cl. .......................... 353/85; 353/88
(58) Field of Classification Search ................ 353/57, 353/60, 97, 98, 88, 84; 349/5, 7
See application file for complete search history.

(56) References Cited

U.S. PATENT DOCUMENTS

| | | | |
|---|---|---|---|
| 6,854,851 B2* | 2/2005 | Yamasaki et al. | 353/97 |
| 7,036,939 B2* | 5/2006 | Cole et al. | 353/52 |
| 7,070,284 B2* | 7/2006 | Tanaka et al. | 353/84 |
| 2002/0105621 A1* | 8/2002 | Kurematsu | 353/30 |
| 2004/0196442 A1* | 10/2004 | D'Alessio et al. | 353/85 |
| 2005/0068505 A1* | 3/2005 | Momose et al. | 353/97 |
| 2007/0064203 A1* | 3/2007 | Sawai | 353/97 |

FOREIGN PATENT DOCUMENTS

JP 2002-365607 12/2002

* cited by examiner

*Primary Examiner*—William C. Dowling
(74) *Attorney, Agent, or Firm*—Westerman, Hattori, Daniels & Adrian, LLP

(57) ABSTRACT

A shutter device can switch between a state where illuminating light from a lamp of an illuminating device is cut off (referred to as a closing state of the shutter device) and a state where illuminating light passes through (referred to as an opening state of the shutter device). A system control circuit instructs a lamp power source to decrease power supplied to the lamp, when receiving information indicating that the shutter device is in the closing state from the detecting portion. After receiving this instruction, the lamp power source decreases the power supplied to the lamp.

16 Claims, 4 Drawing Sheets

PROJECTION TYPE VIDEO DISPLAY

BACKGROUND OF THE INVENTION

FIELD OF THE INVENTION

The present invention relates to a projection type video display such as a liquid crystal projector, and the like.

One of methods of utilizing the liquid crystal projector is to receive a video signal output from a personal computer and to project an image. That is, when a person who makes a presentation operates a personal computer and displays the image that the person intends participants of the presentation to see on a display of the personal computer, the same image as the above-described image is projected on a screen by the liquid crystal projector, so that all the participants can see the image. On the other hand, in some cases, the person who makes a presentation may not wish to show all the images which appear in the course of operating the computer to the participants. It is noted that there is a liquid crystal projector equipped with a shutter on a light-emission side of a light source (see Japanese Patent Application Laying-open No. 2002-365607).

SUMMARY OF THE INVENTION

In response to a request for not projecting any image while a lamp is being turned on, it is conceivable to provide a mechanical shutter device for cutting off light from the lamp. However, in a case where the light from the lamp is cut off by the shutter device, temperature of the lamp and the shutter device rises, and as a result, it is expected that durability of the shutter device and the lamp is decreased.

In view of the above-described circumstances, it is an object of the present invention to provide a projection type video display capable of restraining a temperature rise of a light source and a shutter device caused by closing the shutter device so as to prevent a decrease in durability of the light source and the shutter device.

In order to solve the above-described problems, a projection type video display according to the present invention is a projection type video display that optically modulates light emitted from a light source by a light valve and projects image light, and comprises a shutter device that opens and closes mechanically and cuts off the light in a closing state, a shutter information output portion for outputting opening and closing information of the shutter device, and a light source control means for decreasing a light-emitting amount of the light source in a state where the shutter device is closed.

With the above-described configuration, a light-emitting amount of the light source is decreased in a state where the shutter device is closed. Therefore, it is possible to restrain a temperature rise of the light source and the shutter device, so that a decrease in durability thereof can be prevented.

A projection type video display according to the above-described configuration may comprise an integrator lens formed of a pair of fly's eye lenses on a light-emission side of the light source. The shutter device may be provided between the pair of fly's eye lenses.

In addition, a projection type video display according to these configurations may comprise a temperature sensor for detecting temperature of the light source, a cooling means for air-cooling or liquid-cooling the light source, and a means for controlling cooling power of the cooling means based on an output from the temperature sensor. Or, the projection type video display may comprise a first temperature sensor for detecting temperature of the light source, a second temperature sensor for detecting temperature of the shutter device, a cooling means for air-cooling or liquid-cooling the light source and the shutter device, and a means for controlling cooling power of the cooling means based on outputs from both of the temperature sensors. In the latter configuration, distribution of a heat absorbing medium from the cooling means to the light source and the shutter device may be controlled based on the outputs from both of the temperature sensors.

Furthermore, a projection type video display according to these configurations may comprise a cooling means for cooling the light valve, and may be configured such that the heat absorbing medium from the cooling means is guided to at least one of the shutter device and the light source in a state where the shutter device is closed.

The present invention has an effect such as restraining the temperature rise of the light source and the shutter device caused by closing the shutter device so as to prevent decrease in durability of the light source and the shutter device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a liquid crystal projector according to an embodiment of the present invention will be described with reference to FIG. 1 to FIG. 4.

Figure 1:
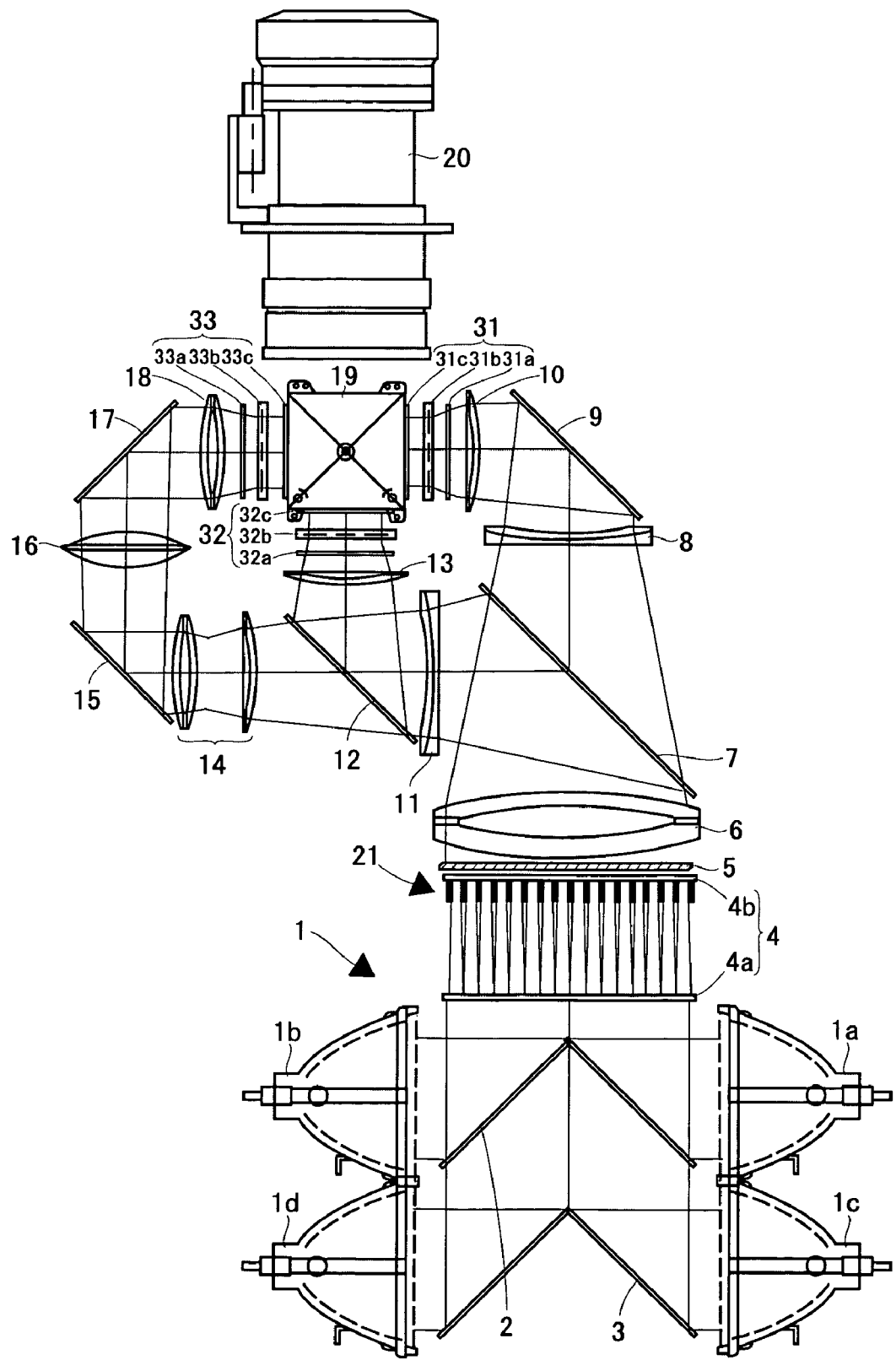
FIG. 1 is a structural view showing an optical system of a liquid crystal projector according to an embodiment of the present invention.

FIG. 1 is a diagram showing a four-lamp and three-panel liquid crystal projector according to this embodiment. An illuminating device 1 is formed of four lamps 1a, 1b, 1c, and 1d, mirrors 2 arranged between the lamps 1a and 1b, and mirrors 3 arranged between the lamps 1c and 1d. Each lamp is formed of an ultra-high pressure mercury lamp, a metal halide lamp, a xenon lamp, and others. Irradiating light of the lamp is emitted after being collimated by a parabolic reflector and guided to an integrator lens 4.

The integrator lens 4 is structured of a pair of fly's eye lenses 4a, 4b. Each pair of lenses guides light emitted from the illuminating device 1 onto an entire surface of a liquid crystal display panel described later. As a result, partial non-uniformity of luminance existing in the illuminating device 1 is evened off, and a difference between a light amount at a screen center and that at a screen perimeter is reduced. Light which passes through the integrator lens 4 is guided to a first dichroic mirror 7 via a polarization conversion system 5 and a condenser lens 6.

The polarization conversion system 5 is structured of a polarization beam splitter array (hereinafter, referred to as a PBS array). The PBS array is provided with a polarized light separating surface and a retardation plate (½ λ plate). Each polarized light separating surface of the PBS array transmits P-polarized light, for example, out of light from the integrator lens 4, and changes an optical path of S-polarized light by 90 degrees. The S-polarized light having the optical path changed is reflected by an adjacent polarized light separating surface, and given off as it is. On the other hand, the P-polarized light that passes through the polarized light separating surface is converted into the S-polarized light by the retardation plate provided on a front side (light-exit side) of the polarized light separating surface, and given off therefrom. That is, in this case, approximately all the light is converted into the S-polarized light.

The first dichroic mirror 7 transmits light in a red wavelength band, and reflects light in a cyan (green+blue) wavelength band. The light in a red wavelength band that passes through the first dichroic mirror 7 is reflected by a reflection mirror 9 via a concave lens 8, and has an optical path changed. The light in a red wavelength band reflected by the reflection mirror 9, via a lens 10, is guided to a transmission type liquid crystal display panel for light in red 31 and optically modulated as a result of passing therethrough. On the other hand, the light in a cyan wavelength band reflected by the first dichroic mirror 7 is guided to a second dichroic mirror 12, via the concave lens 11.

The second dichroic mirror 12 transmits light in a blue wavelength band, and reflects light in a green wavelength band. The light in a green wavelength band reflected by the second dichroic mirror 12, via a lens 13, is guided to a transmission type liquid crystal display panel for light in green 32, and optically modulated as a result of passing therethrough. In addition, the light in a blue wavelength band that passes through the second dichroic mirror 12, via relay lenses 14, a reflection mirror 15, relay lenses 16, a reflection mirror 17, and relay lenses 18, is guided to a transmission type liquid crystal display panel for light in blue 33, and optically modulated as a result of passing therethrough.

Each liquid crystal display panel 31, 32, and 33 is formed of being provided with light-incidence-side polarizers 31*a*, 32*a*, and 33*a*, panel portions 31*b*, 32*b*, and 33*b* formed by sealing a liquid crystal between one pair of glass plates (in which a pixel electrode and an alignment film are formed), and light-exit-side polarizers 31*c*, 32*c*, and 33*c*.

Each modulated light (image light of respective colors) modulated by passing through the liquid crystal display panels 31, 32, and 33 is combined by a cross dichroic prism 19, and rendered full-color image light. The full-color image light is projected by a projection lens 20, and displayed on a screen not shown.

Figure 2A:
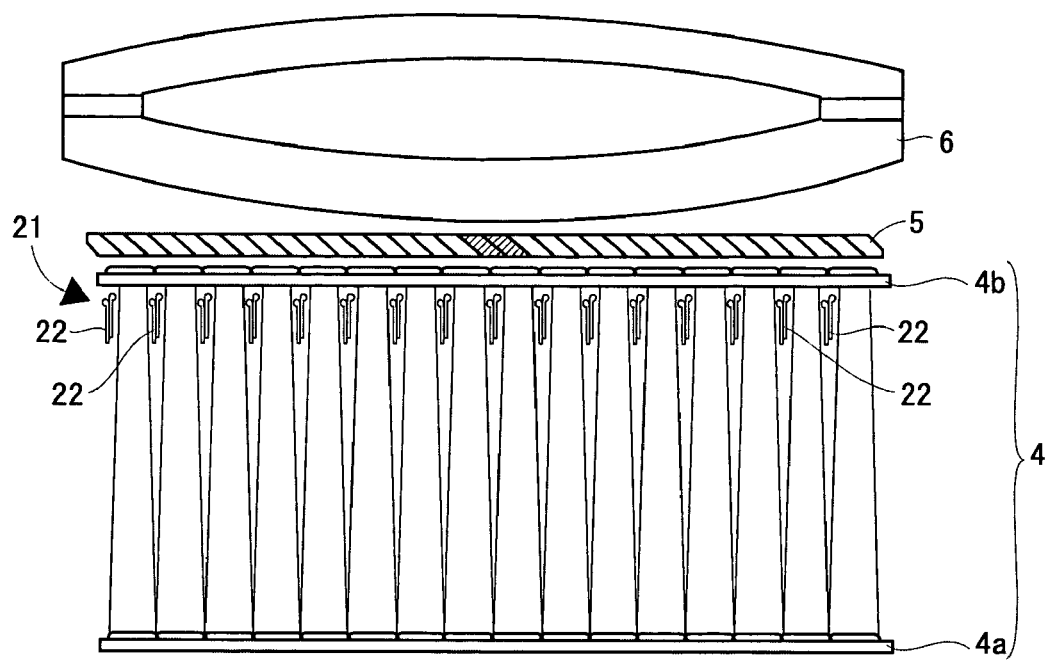
FIG. 2A is a plan view showing a detail of a shutter device.
Figure 2B:
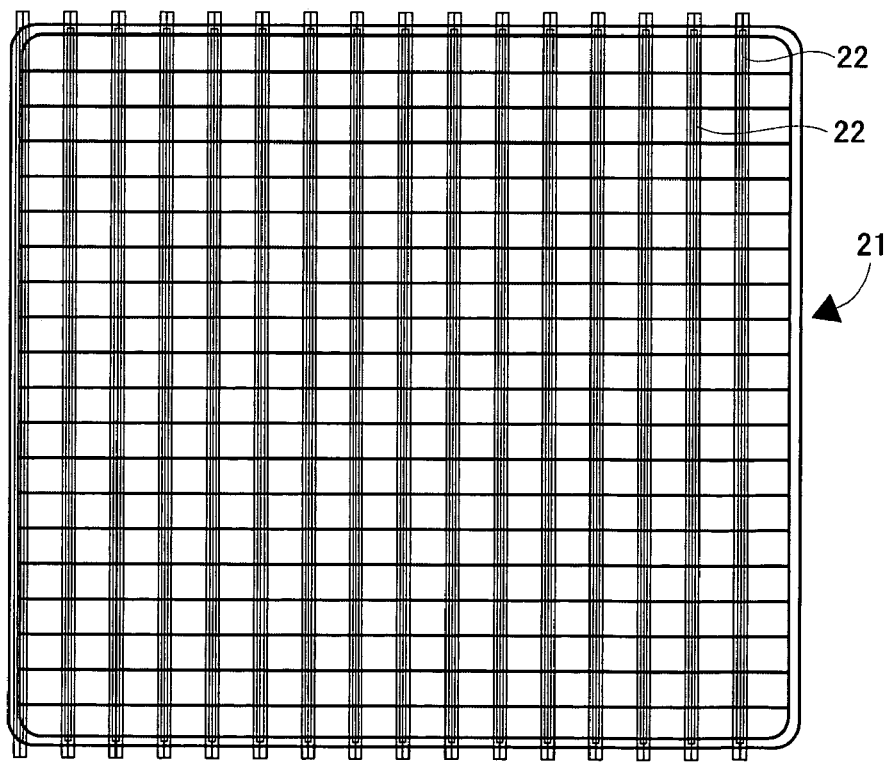
FIG. 2B is a front view showing a detail of the shutter device.

A shutter device 21, as shown in FIG. 2, is formed of a plurality of shutter parts 22. Each shutter part 22 is provided in a position close to the fly's eye lens 4*b* positioned on a side of the polarization conversion system 5 and yet, not blocking a passage of effective illuminating light. Each shutter part 22 is formed of a shaft arranged vertically and a shading plate fixed firmly to the shaft. The shading plate is formed by applying a light absorbing material in black to a member made of resin or metal so as to absorb received light. The shading plate is turned by turning the shaft by 90 degrees, so that it is possible to switch between a state where illuminating light is cut off (referred to as a closing state of the shutter device) and a state where illuminating light passes through (referred to as an opening state of the shutter device).

With the shutter device 21 according to the above-described configuration, the illuminating light is cut off between one pair of fly's eye lenses 4*a*, 4*b*. As a result, it is possible to prevent light from being incident on the liquid crystal display panels 31, 32, and 33 in a case where an image projection is temporarily stopped. The shutter parts 22 in the shutter device 21 are driven by an actuator such as a solenoid, and others. Driving information (opening and closing information) of the shutter parts 22 is notified by a detecting portion 47 (see FIG. 3) to a system control circuit 40 described later. The detecting portion 47 is formed of a switch connected to the solenoid, a proximity switch arranged close to the solenoid, a switch provided in a mechanism for transmitting a movement of the solenoid to the shutter parts 22, and others. In addition, if the system control circuit 40 outputs opening and closing signals to the solenoid, the system control circuit 40 can also function as the detecting portion 47.

Figure 3:
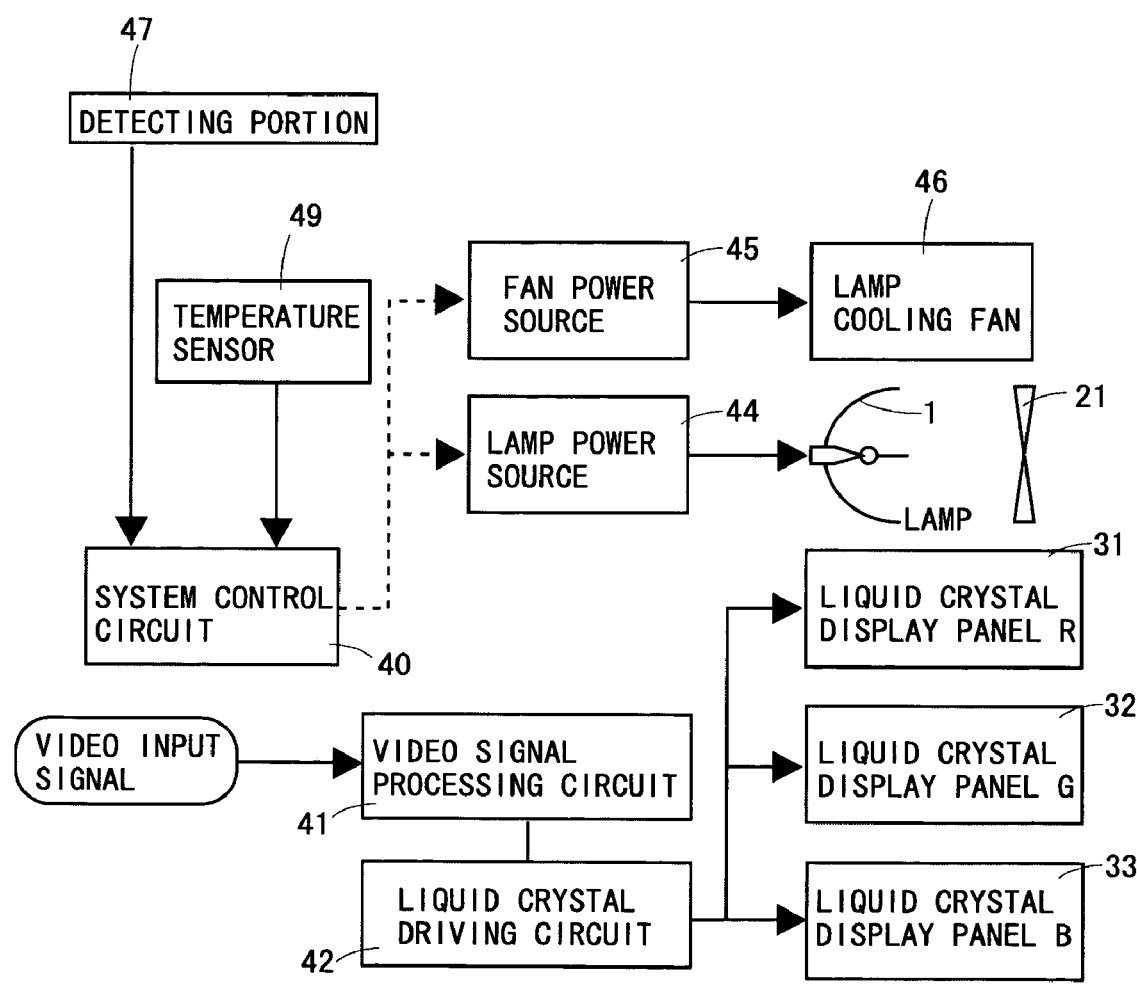
FIG. 3 is a block diagram showing a lamp control system and a cooling fan control system of the liquid crystal projector.

FIG. 3 is a block diagram showing an image processing system, a lamp control system, and a cooling fan control system, and the like, of the projection type video display. A video signal processing circuit 41 inputs a video signal and subjects the input signal to a frequency conversion (conversion of the number of scanning lines), a gamma correction process in view of "applied voltage—light transmission characteristic of the liquid crystal display panel", and other processes, and applies the corrected video signal (image data) to a liquid crystal driving circuit 42. The liquid crystal driving circuit 42 drives the liquid crystal display panels 31, 32, and 33 on the basis of the corrected video signal. The system control circuit 40 controls operations of a lamp power source 44, a fan power source 45, and others. A detail of the system control circuit 40 will be described later. The lamp power source 44 is a circuit for starting and stopping power supply to the lamp and adjusting power supplied thereto (adjusting light amount). The lamp power source 44 is utilized not only for adjusting power supplied to the lamp in a state where the shutter is closed, described later, but for controlling a light amount of the lamp according to a luminance signal of an input video signal (control such as increasing a light amount of the lamp when the luminance signal is high, for example). The fan power source 45 is a circuit for starting and suspending power supply to a lamp cooling fan 46 and adjusting power supplied thereto. A temperature sensor 49 measures neighborhood temperature of the lamp, and applies the measured temperature to the system control circuit 40. Hereinafter, processes of the system control circuit 40 according to the present invention will be described.

(1) The system control circuit 40 instructs the lamp power source 44 to decrease power supplied to the lamp, when receiving information indicating that the shutter device 21 is in the closing state from the detecting portion 47 (in this embodiment, instructs to reduce light-emitting amount of the lamp to a minimum). After receiving this instruction, the lamp power source 44 decreases power supplied to the lamp. Needless to say, the system control circuit 40 instructs the lamp power source 44 to restore the amount of power supplied to the lamp (to return to a control of a light amount of the lamp according to the luminance signal of the input video signal, if the lamp power source 44 performs the control), when receiving information indicating that the shutter device 21 returned to the opening state from the detecting portion 47.

(2) The system control circuit 40 obtains information on detected temperature from the temperature sensor 49. The system control circuit 40 instructs the fan power source 45 to increase power supplied to the lamp cooling fan 46 when determining that the temperature reached or exceeded an upper temperature limit. This control is performed in order to keep the temperature of the lamp within a specified range, regardless of opening and closing of the shutter device 21. As described above, although the power supplied to the lamp is decreased in a state where the shutter device 21 is closed, there is a possibility of temperature rise of the lamp. Accordingly, also in a case where such the temperature rise is detected by the temperature sensor 49, it is possible to decrease the temperature by increasing the rotation speed of the lamp cooling fan 46.

Figure 4:
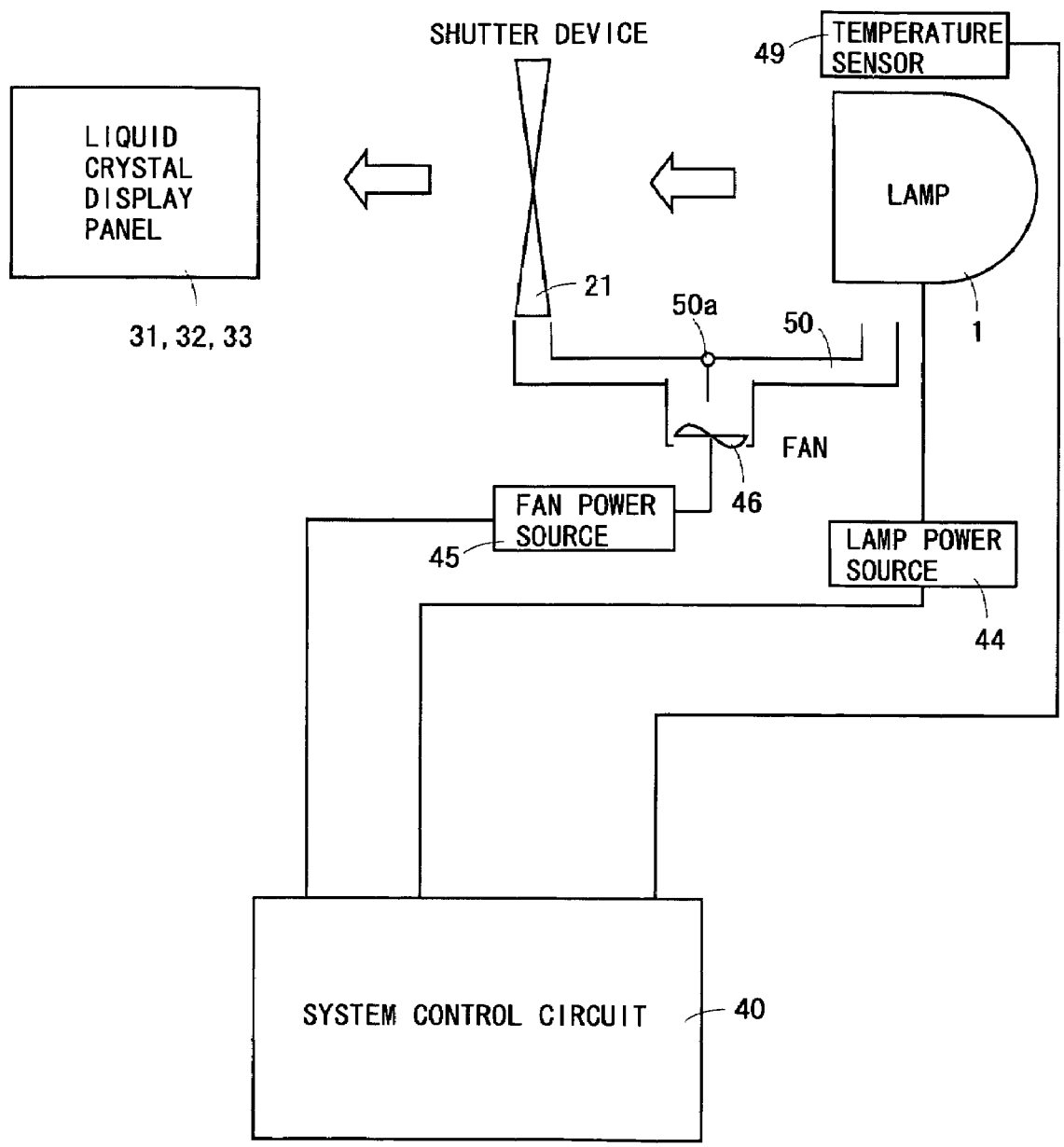
FIG. 4 is a block diagram showing another example of a lamp control system and a cooling fan control system of the liquid crystal projector.

Incidentally, there are two cases of temperature rise in a state where the shutter device 21 is closed. One is the temperature rise of the lamp, and the other is the temperature rise of the shutter device 21. The shutter device 21, as a result-of being positioned in the vicinity of the lamp, receives cooling air from the lamp cooling fan 46 in some degree. Accordingly, the temperature rise is restrained to some extent. However, the temperature sensor 49 is a sensor for detecting ambient temperature of the lamp, so that it is conceivable that the rotation speed of the lamp cooling fan 46 is not increased despite very high temperature in the shutter device 21. Therefore, another temperature sensor may be arranged in the vicinity of the shutter device 21, and the system control circuit 40 may control the lamp cooling fan 46 based on outputs from both of the temperature sensors. For example, the rotation speed of the fan is increased when at lease one of the temperature on a side of the lamp and the temperature on a side of the shutter device 21 exceeded the upper temperature limit. Or, a configuration in which cooling air generated by the lamp cooling fan 46 is distributed to the lamp and the shutter device 21 may be adopted. For example, as shown in FIG. 4, a duct 50 for guiding cooling air generated by the lamp cooling fan 46 to the lamp and the shutter device 21 is provided. In addition, it is preferable that a switching valve 50a is provided in the duct 50 and thereby flow volume of the cooling air to the lamp and the shutter device 21 is adjusted. For example, the flow volume of the cooling air to the shutter device 21 is increased in a case where the temperature of the lamp is below the upper limit while the temperature of the shutter device 21 exceeded the upper limit, or in other cases. The switching valve 50a is driven by an actuator (for example, a solenoid and others) controlled by the system control circuit 40. Instead of providing the duct 50, one or a plurality of movable flaps may be provided in front of the lamp cooling fan 46 and the flow volume (direction of airflow) of the cooling air to the lamp and the shutter device 21 may be adjusted by a direction of the movable flap (in a case where there are a plurality of movable flaps, directions of the flaps may be individually controlled). In addition, in a configuration in which a panel cooling fan for cooling a liquid crystal display panel (light valve) is provided, a duct and a switching valve for guiding the cooling air from the panel cooling fan to the shutter device 21 and/or the lamp may be provided, and the cooling air from the panel cooling fan may be guided to the shutter device 21 and/or the lamp by driving the switching valve in a state where the shutter device 21 is closed.

It is noted that, the three-panel liquid crystal projector using the liquid crystal display panels is shown in the above-described embodiment. However, it is possible to apply the present invention to a projection type video display provided with another image light generating system. Furthermore, although a configuration in which the shutter device is provided between a pair of fly's eye lenses 4a, 4b is shown, it is not always the case. In addition, although an air-cooling method is shown as the cooling means, a liquid-cooling method can also be adopted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that optically modulates light emitted from a light source by a light valve and projects image light, comprising:
    a shutter device that opens and closes mechanically, and cuts off the light in a closing state;
    a shutter information output portion for outputting opening and closing information of the shutter device; and
    a light source control means for decreasing a light-emitting amount of the light source when detecting that the shutter device is in the closing state.

2. A projection type video display according to claim 1, comprising an integrator lens formed of a pair of fly's eye lenses on a light-emission side of the light source, wherein the shutter device is provided between the pair of fly's eye lenses.

3. A projection type video display according to claim 1, comprising:
    a temperature sensor for detecting temperature of the light source;
    a cooling means for air-cooling or liquid-cooling the light source; and
    a means for controlling cooling power of the cooling means based on an output from the temperature sensor.

4. A projection type video display according to claim 2, comprising:
    a temperature sensor for detecting temperature of the light source;
    a cooling means for air-cooling or liquid-cooling the light source; and
    a means for controlling cooling power of the cooling means based on an output from the temperature sensor.

5. A projection type video display according to claim 1, comprising:
    a first temperature sensor for detecting temperature of the light source;
    a second temperature sensor for detecting temperature of the shutter device;
    a cooling means for air-cooling or liquid-cooling the light source and the shutter device; and
    a means for controlling cooling power of the cooling means based on outputs from both of the temperature sensors.

6. A projection type video display according to claim 2, comprising:
    a first temperature sensor for detecting temperature of the light source;
    a second temperature sensor for detecting temperature of the shutter device;
    a cooling means for air-cooling or liquid-cooling the light source and the shutter device; and
    a means for controlling cooling power of the cooling means based on outputs from both of the temperature sensors.

7. A projection type video display according to claim 5, wherein distribution of a heat absorbing medium from the cooling means to the light source and the shutter device is controlled based on the outputs from both of the temperature sensors.

8. A projection type video display according to claim 6, wherein distribution of a heat absorbing medium from the cooling means to the light source and the shutter device is controlled based on the outputs from both of the temperature sensors.

9. A projection type video display according to claim 1, comprising a cooling means for cooling the light valve, wherein the heat absorbing medium from the cooling means is guided to at least one of the shutter device and the light source in a state where the shutter device is closed.

10. A projection type video display according to claim 2, comprising a cooling means for cooling the light valve, wherein the heat absorbing medium from the cooling means is guided to at least one of the shutter device and the light source in a state where the shutter device is closed.

11. A projection type video display according to claim 3, comprising a cooling means for cooling the light valve, wherein the heat absorbing medium from the cooling means is guided to at least one of the shutter device and the light source in a state where the shutter device is closed.

12. A projection type video display according to claim 4, comprising a cooling means for cooling the light valve, wherein the heat absorbing medium from the cooling means is guided to at least one of the shutter device and the light source in a state where the shutter device is closed.

13. A projection type video display according to claim 5, comprising a cooling means for cooling the light valve, wherein the heat absorbing medium from the cooling means is guided to at least one of the shutter device and the light source in a state where the shutter device is closed.

14. A projection type video display according to claim 6, comprising a cooling means for cooling the light valve, wherein the heat absorbing medium from the cooling means is guided to at least one of the shutter device and the light source in a state where the shutter device is closed.

15. A projection type video display according to claim 7, comprising a cooling means for cooling the light valve, wherein the heat absorbing medium from the cooling means is guided to at least one of the shutter device and the light source in a state where the shutter device is closed.

16. A projection type video display according to claim 8, comprising a cooling means for cooling the light valve, wherein the heat absorbing medium from the cooling means is guided to at least one of the shutter device and the light source in a state where the shutter device is closed.

* * * * *